United States Patent Office 2,720,475
Patented Oct. 11, 1955

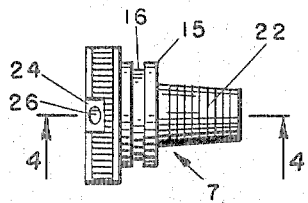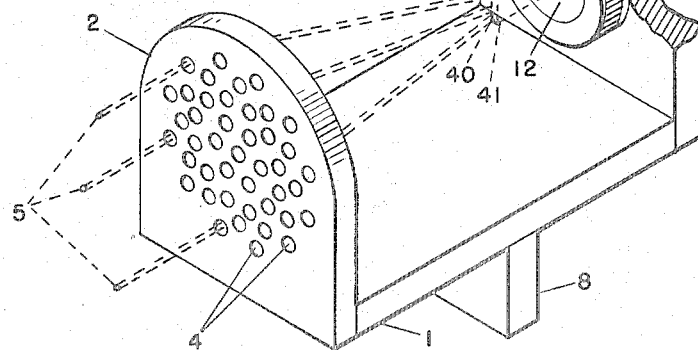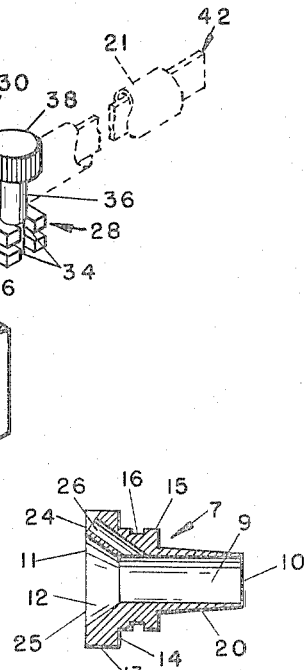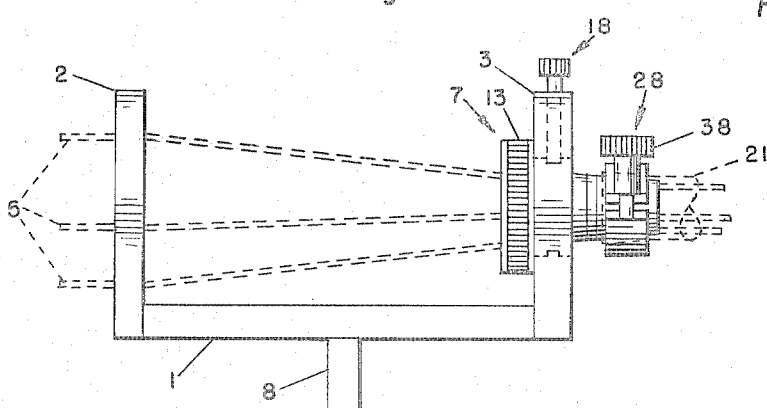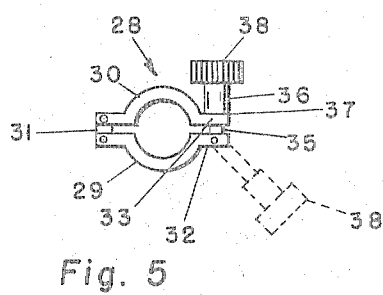

2,720,475

CABLE ASSEMBLY DEVICE

George H. Geiger, Woodland Hills, Calif.

Application May 11, 1953, Serial No. 354,434

9 Claims. (Cl. 154—2.26)

(Granted under Title 35, U. S. Code (1952), sec. 266)

The invention described herein may be manufactured and used by or for the Government of the United States of America for governmental purposes without the payment of any royalties thereon or therefor.

The invention relates to assembling a number of wires or cables within a flexible sheath or tube. More particularly, the invention is concerned with a device for drawing a relatively large number of electrical cables into a protective flexible plastic tube and properly assembling them within such tube.

An especially vexing problem has been encountered in the past with respect to assembling a number of electrical cables within a plastic protective sheath without requiring a large amount of time, labor and other expense incident to waste of material. A solution to this problem is of particular importance, for example, in the aircraft industry, wherein a large number of such cable assemblies is employed for airplane electrical systems.

In fabricating an assembly of this type, it has been the procedure for several men to first take up to 20 or more lengths of wire, each of which may be as much as 40 ft. in length, and place these wires on a long table. A lead member is then passed through the desired length of plastic, e. g. vinyl resin known as "vinylite," tubing in which the wires are to be assembled, and the ends of such wires attached to the lead member. The assembly of wires is then pulled through the tube. This task is a very long and tedious one due to the excess friction developed between the wires and the inside surface of the tube, ordinarily requiring the time and effort of some four or five men. Often, after progressing, say about half way through the tube or sheath it is impossible to draw the wires any further, requiring removal of the wires and the use of a larger tube. Moreover, difficulty is encountered in that the wires often tend to enter the flexible tube in a criss-cross manner, which condition may result in a short circuit in some portion of the cables. Further, excess material is often employed as a result of the necessity for using oversize plastic tubes, and a substantial amount of tubing is also wasted if a tube which is too small is initially used and is damaged due to the failure of the wires to pass through it.

One object of the invention is to provide means for assembling a number of wires or cables within a flexible sheath or tube.

Another object is to provide a device for assembling a comparatively large number of electrical wires or cables within a substantially cylindrical flexible plastic protective sheath or tube without binding and with a minimum of labor, time and expense.

Another object is the provision of a simple, inexpensive and rugged device of this type.

Other objects and many of the attendant advantages of this invention will be readily appreciated as the same becomes better understood by reference to the following detailed description when considered in connection with the accompanying drawings wherein:

Fig. 1 is an isometric view of the invention device, a portion of which is broken away to show certain details, Fig. 2 is a front view of the device of Fig. 1, Fig. 3 is a plan view of the cable guide means of the invention device, Fig. 4 is a cross sectional view taken along line 4—4 of the cable guide means of Fig. 3 and Fig. 5 shows another feature of the invention device.

The foregoing objects are accomplished by the device of this invention, which briefly comprises a base and a pair of upwardly extending spaced apart members supported thereon, one of such members being multiply apertured for passage of cables or wires therethrough. Supported by the other upwardly extending member is a cable guide means so constructed and arranged with respect to the multiply apertured member as to maintain a flexible protective tube or sheath into which the cables are to be drawn, in predetermined position to receive such cables, and to facilitate passage of the cables from the multiply apertured member into the tube and proper assembly of such cables therein, in the manner hereinafter described in detail.

As shown in Figs. 1 and 2, the invention device comprises a base 1 having a pair of upwardly extending members 2 and 3 fixed parallel to each other at opposite ends of the base. End member 2 is apertured by a number of round holes 4 of various diameters, through which may be drawn electrical wires 5 of different sizes. Where wires or cables of only one specific size are employed, all of such holes may be of the same diameter. End member 3 has a relatively large circular aperture 6 therein, in which is supported cable guide means or adapter 7, one of the main features of the invention. A clamping bar 8 is attached to the bottom of base 1 to serve as a means for clamping the device in rigid position during use.

The cable guide means or adapter 7, as particularly seen in Figs. 3 and 4, is in the form of an elongated body which is positioned within member 3 with its axis substantially normal to such member. This body has an essentially cylindrical hollow portion 9 therein extending axially from end 10 of such body and terminating near its opposite end 11 in an outwardly flared hollow portion 12. The guide means is positioned within aperture 6 of end member 3 so that the flared hollow portion 12 faces end member 2. Such flared hollow portion functions, as seen in Fig. 1, to provide a substantially continuous path for cables 5 passing through the openings in end member 2 and converging into guide means 7 without any abrupt change in direction which would be the case if the cylindrical hollow portion 9 were extended completely to end 11 of the guide means or adapter 7, thereby forming a sharp edge. Hence, it is seen that such flared portion is devoid of sharp edges over which the cables must pass, minimizing wear of the cables as they are drawn through the guide means and reducing the amount of force required for this purpose. A cylindrical flange 13 is located at that end of the elongated guide means body containing the flared hollow portion, and shoulder 14 of the flange abuts the inner wall 17 of end member 3, tending to hold such body axially in position therein and without the possibility of undesirable outward movement of the guide means.

The elongated body of guide means 7 also has a cylindrical central portion 15 of substantially the same width as the thickness of end member 3, such central portion resting within the aperture 6 of this member. Central body portion 15 has a groove 16 substantially in the center thereof. A set screw 18 (see Fig. 1) is positioned longitudinally within end member 3, the end 19 of such set screw being adapted to fit into groove 16 and in contact with the central body portion 15 of the guide means when the screw is turned down, for the purpose of holding guide means 7 in fixed relationship to end member 3 and preventing the guide means or adapter from rotating within end member 3. However, the provision of groove 16 in conjunction with set screw 18 also enables guide means 7 to be rotated within end member 3 without lateral displacement therefrom, for reasons noted hereinafter, by loosening screw 18 sufficiently to withdraw the end thereof from frictional contact with central portion 15 of the guide means but not enough to completely withdraw set screw 18 from groove 16 so that the end of the screw rides in the groove during such rotation.

Adjacent end 10 of the elongated body forming the guide means is a tapered portion 20 extending outwardly from end member 3 and having grooves or threads 22 on the surface thereof for frictionally engaging the internal surface of a flexible plastic tube 21 adapted to fit over tapered portion 20. The central portion 15 of the cable guide means 7 has a larger diameter at any point along its width than the tapered portion 20 in order to help maintain the guide means in a more rigid position within end member 3. A recess 24 is formed in the outer face 25 of flange 13 and a second cylindrical hollow portion 26, of smaller diameter than the main hollow portion 9, extends in a downwardly sloping direction from the surface of such recess through flange 13 and into the central body portion 15, communicating therein with the main axially positioned hollow portion 9. Hollow portion 26 is for the purpose of introducing compressed air, if desired, into the flexible protective covering or tube attached to the tapered portion 20, in order to inflate the tube to facilitate passage of the wires or cables 5 thereinto.

Clamping means 28, shown in detail in Fig. 5, is provided for positioning around tapered portion 20 of guide means 7, to maintain the flexible plastic sheath or covering 21 securely in place thereagainst without slippage, enabling the cables to be readily drawn into the sheath and assembled therein. The clamping means includes a clamp body formed of two semi-circular rings 29 and 30 each having an inside radius intermediate in size between the different external radii of the opposite ends of tapered portion 20 of the guide means, so that when the rings are coupled in the manner hereinafter described they will fit tightly around an intermediate section between the ends of such portion 20 and over a flexible tube 21 positioned thereon, as more clearly seen in Fig. 2.

Semi-circular rings 29 and 30 are pivotally fastened together at one end by means of a clamp link 31. The opposite end of rings 29 and 30 each have a flange 32 and 33 respectively, thereon. Each of flanges 32 and 33 is in the form of a U-shaped member (see Fig. 1) having a recess 34 therein. A clamp screw 35 is pivotally attached at its end to flange 32 and is adapted, on pivotal movement into its operative full line position shown in Fig. 5, to pass into recess 34 of flanges 32 and 33. In operative engagement around clamp screw 35 is a collar 36, the shoulder 37 of which is adapted to make contact with flange 33 when the knurled clamp nut 38 attached to the opposite end of the collar is turned down. Thus, clamp means 28 can be tigtened or loosened about tapered portion 20 and a flexible tube 21 positioned thereon by turning clamp nut 38 down so as to bring semi-circular rings 29 and 30 closer together or by turning the clamp nut in the opposite direction to withdraw collar 36 from contact with flange 33 and permit rings 29 and 30 to spread apart.

In utilizing the invention device for assembling a plurality of wires or cables in a flexible, particularly plastic, protective covering or sheath, cable guide means 7 is positioned securely within member 3 to prevent rotation of the former, by turning down set screw 18 so that it is in contact with the central body portion 15 of the guide means or adapter 7. The flexible protective covering in the form of a substantially cylindrical tube is pulled or forced over the outwardly extending tapered portion 20 of the guide means until the former is tightly held in contact with the latter by frictional engagement with the roughened or grooved surface of the tapered portion. Various types of flexible plastic tubes or coverings known in the art may be employed such as those made of synthetic resins, particularly vinyl resins, of which "vinylite" is representative. Clamping means 28 is then secured in position over the flexible tube 21 and the tapered portion 20 of the cable guide means, and clamp nut 38 turned down to tighten rings 29 and 30 about the plastic tube.

A plurality of cables 5 are then passed through suitably sized openings 4 in end member 2, and the ends 40 of such cables are secured to one end 41 of a leader member 42 previously conducted through tube 21 and guide means 7. The leader member may be constructed of any suitable material and is preferably in the form of a metallic, e. g. steel, strip. The ends 40 of the wires or cables may be fastened to such leader member in any suitable manner such as by soldering. After the cables have been securely attached to leader strip 42, the latter is pulled outwardly from the end opposite that to which the cables are attached, drawing the cables through guide means 7 and into the flexible plastic tube 21. Should difficulty be encountered in this operation, a compressed air nozzle may be attached to flange 13 and communicating with aperture 26 therein to maintain tube 21 inflated while the cables are being assembled therein. When the cables or wires 5 have passed into the protective covering or tube 21, the ends of the wires are detached from leader strip 42, clamp nut 38 turned in a direction to loosen clamping means 28 about the tube, and the latter with wires 5 assembled therein is pulled free of tapered portion 20 of guide means 7.

In some instances it is desired to assemble cables 5 in a spiral manner within plastic tube 21. This can be accomplished by loosening set screw 18 sufficiently to permit cable guide means 7 to rotate within end member 3 with the end of the screw riding in groove 16, as previously noted, and rotating the guide means while the cables are being drawn into tube 21 by manually turning knurled flange 13 of the guide means.

It is accordingly apparent that the invention affords a simple, rugged and inexpensive cable assembly device which permits rapid and proper assembly of a number of cables or wires within a flexible protective covering with a minimum of manpower and substantially no waste of covering material due to damage thereof while passing the cables into it. In addition to these advantages, the invention enables use of smaller diameter flexible covers or sheaths for assembly therein of a given number of wires, and wherein the wires so assembled are more snugly fitted than is conventionally the case, thereby providing a saving of material. Moreover, use of smaller diameter covers results in a saving of space where, for example, a large number of cable assemblies are to be placed in a confined space, as is often the case in connection with aircraft electrical systems. Further, the wires or cables pass through the flexible, e. g. vinyl plastic, tube or covering employed in a very neat and uniform condition, rather than in a haphazard criss-cross condition which is conducive to causing short circuits in the wires or cables assembled.

Obviously many modifications and variations of the present invention are possible in the light of the above teachings. It is therefore to be understood that within the scope of the appended claims the invention may be practiced otherwise than as specifically described.

I claim:

1. A cable assembly device which comprises a base, a pair of upwardly extending members supported thereon, said members being spaced from each other, one of said members being multiply apertured for passage of cables therethrough, cable guide means in the form of an elongated body positioned on said other member and extending outwardly therefrom with its axis substantially normal to said other member, said body having an elongated hollow portion extending axially therein from one end of said body and terminating in an outwardly flared hollow portion at the other end of said body facing said one member, the outwardly extending portion of said body being tapered and having means thereon for frictionally engaging the internal surface of a flexible tube adapted to fit over said last mentioned portion.

2. A cable assembly device as defined in claim 1 including clamping means positioned over the outwardly extending portion of said body for maintaining said flexible tube securely in place thereagainst.

3. An electrical cable assembly device which comprises a base, a pair of upwardly extending members each supported near opposite ends of said base and spaced from each other, one of said members being apertured by a plurality of openings for passage of a plurality of cables therethrough, cable guide means in the form of an elongated body positioned within said other member with its axis substantially normal to said other member, said body having an essentially cylindrical hollow portion extending axially therein from one end of said body and terminating in an outwardly flared hollow portion at the other end of said body facing said one member, a flange on said other end of said body abutting said other member and a tapered portion on said one end extending outwardly from said other member and having means on the surface thereof for frictionally engaging the internal surface of a flexible plastic tube adapted to fit over said last mentioned portion.

4. An electrical cable assembly device as defined in claim 3 including clamping means positioned over said outwardly extending tapered portion for maintaining said flexible tube securely in place thereagainst.

5. An electrical cable assembly device as defined in claim 4 including means for holding said cable guide means in a predetermined position in relation to said other member.

6. An electrical cable assembly device which comprises a base, a pair of upwardly extending members each supported near opposite ends of said base and spaced from each other, one of said members being apertured by a plurality of openings for passage of a plurality of cables therethrough, cable guide means in the form of an elongated body positioned within said other member with its axis substantially normal to said other member, said body having an essentially cylindrical hollow portion extending axially therein from one end of said body and terminating in an outwardly flared hollow portion at the other end of said body facing said one member, a flange on said other end of said body abutting said other member, a central portion and a tapered portion on said one end extending outwardly from said other member and having a roughened surface for frictionally engaging the internal surface of a flexible plastic tube adapted to fit over said last mentioned portion, and means associated with said other upwardly extending member for making contact with the central portion of said body to hold it in fixed nonrotatable relation to said other member and clamping means positioned over the tapered portion of said body for maintaining said flexible tube securely in place thereagainst.

7. An electrical cable assembly device for assembling a plurality of electrical cables within a protective flexible plastic tube, which comprises a base, a pair of upwardly extending members supported in spaced parallel relation to each other near opposite ends of said base, one of said members being apertured by a plurality of relatively small openings for passage of a plurality of cables therethrough and the other member having a relatively large opening, cable guide means in the form of an elongated body positioned in the opening in said other member with its axis substantially normal to said other member, said body having an essentially cylindrical hollow portion extending axially therein from one end of said body and terminating in an outwardly flared hollow portion at the other end of said body facing said one member, a flange on said other end of said body abutting said other member, a central portion having a groove therein, and a tapered portion on said one end extending outwardly from said other member and having a roughened surface for frictionally engaging the internal surface of a flexible plastic tube adapted to fit over said last mentioned portion, and an externally operable screw member positioned longitudinally within said other upwardly extending member, the end of said screw member being adapted to fit into said groove and in contact with said body to hold it in fixed nonrotatable relation to said other member, and clamping means positioned over the tapered portion of said body for maintaining said flexible tube securely in place thereagainst.

8. An electrical cable assembly device for assembling a plurality of electrical cables within a protective flexible plastic tube, which comprises a base, a pair of upwardly extending members supported in spaced parallel relation to each other at opposite ends of said base, one of said members being apertured by a plurality of relatively small openings for passage of a plurality of cables therethrough and the other member having a relatively large opening, cable guide means in the form of an elongated body positioned within said other member with its axis substantially normal to said other member, said body having an essentially cylindrical hollow portion therein extending axially from one end of said body and terminating in an outwardly flared hollow portion at the other end of said body facing said one member, a flange on said other end of said body abutting said other member, a central portion having a groove therein, a tapered portion on said one end extending outwardly from said other member and having screw threads on the surface thereof for frictionally engaging the internal surface of a flexible plastic tube adapted to fit over said last mentioned portion, said central portion being positioned in the relatively large opening in said other member and having a larger diameter than said tapered portion, and an aperture in said flange extending from the outer surface thereof into said central body portion and communicating with said cylindrical hollow portion, an externally operable screw member positioned longitudinally within said other upwardly extending member, the end of said screw member being adapted to fit into said groove and in contact with the central portion of said body to hold it in fixed nonrotatable relation to said other member, and clamping means positioned over the tapered portion of said body for maintaining said flexible tube securely in place thereagainst.

9. An electrical cable assembly device as defined in claim 8, wherein said one upwardly extending member is apertured with openings of various sizes and said flange is cylindrical in shape.

References Cited in the file of this patent

UNITED STATES PATENTS

| 1,993,110 | Myers | Mar. 5, 1935 |
| 2,222,505 | Ford | Nov. 19, 1940 |